「United States Patent」 (12)
Szegedi

(10) Patent No.: US 11,638,040 B2
(45) Date of Patent: Apr. 25, 2023

(54) ECO-FRIENDLY CODEC-BASED SYSTEM FOR LOW LATENCY TRANSMISSION

(71) Applicant: Schmied Enterprises LLC, San Jose, CA (US)

(72) Inventor: Miklos Szegedi, San Jose, CA (US)

(73) Assignee: Schmied Enterprises LLC, San Jose, CA (US)

( * ) Notice: Subject to any disclaimer, the term of this patent is extended or adjusted under 35 U.S.C. 154(b) by 0 days.

(21) Appl. No.: 17/408,322

(22) Filed: Aug. 20, 2021

(65) Prior Publication Data

US 2022/0060753 A1 Feb. 24, 2022

Related U.S. Application Data

(60) Provisional application No. 63/069,475, filed on Aug. 24, 2020.

(51) Int. Cl.
*H04N 19/85* (2014.01)
*H04N 19/93* (2014.01)
(Continued)

(52) U.S. Cl.
CPC ............ *H04N 19/85* (2014.11); *H04L 67/01* (2022.05); *H04L 67/568* (2022.05);
(Continued)

(58) Field of Classification Search
CPC .... H04N 19/85; H04N 19/105; H04N 19/117; H04N 19/119; H04N 19/182;
(Continued)

(56) References Cited

U.S. PATENT DOCUMENTS 8,489,403 B1 7/2013 Griffin et al.
8,645,763 B2 2/2014 Szegedi et al.
(Continued)

FOREIGN PATENT DOCUMENTS

CN 114365503 A 4/2022
EP 4102851 A2 12/2022
(Continued)

OTHER PUBLICATIONS

Adobe Systems Incorporated. Public Patent License ISO 32000-1: 2008—PDF 1.7. Adobe Systems Incorporated. (2008). Accessed at www.adobe.com/pdf/pdfs/ISO32000-1PublicPatentLicense.pdf?wa=WWW20DAS.
(Continued)

*Primary Examiner* — Tracy Y. Li
(74) *Attorney, Agent, or Firm* — Wilson Sonsini Goodrich & Rosati

(57) ABSTRACT

Disclosed herein is a system for providing a low-latency transmission between a client and a server. The client may be a thin client that leverages a codec to receive data transmissions from the server over a dedicated connection and need not require significant processing power. The client-server system has additional capabilities for reducing latency, including providing a view port for viewing portions of documents in a buffer cache and providing a method for blending image content by applying an alpha coefficient to separated red, blue, and green image components.

18 Claims, 4 Drawing Sheets

(51) Int. Cl.
*H04N 19/80* (2014.01)
*H04N 19/186* (2014.01)
*H04N 19/423* (2014.01)
*H04N 19/117* (2014.01)
*H04N 19/105* (2014.01)
*H04N 19/119* (2014.01)
*H04N 19/436* (2014.01)
*H04N 19/182* (2014.01)
*H04L 67/01* (2022.01)
*H04L 67/568* (2022.01)
*G06F 3/0485* (2022.01)

(52) U.S. Cl.
CPC ......... *H04N 19/105* (2014.11); *H04N 19/117* (2014.11); *H04N 19/119* (2014.11); *H04N 19/182* (2014.11); *H04N 19/186* (2014.11); *H04N 19/423* (2014.11); *H04N 19/436* (2014.11); *H04N 19/80* (2014.11); *H04N 19/93* (2014.11); *G06F 3/0485* (2013.01)

(58) Field of Classification Search
CPC .. H04N 19/186; H04N 19/423; H04N 19/436; H04N 19/80; H04N 19/93; H04N 21/4331; H04N 21/631; H04N 21/4438; H04L 67/01; H04L 67/568; G06F 3/0485
See application file for complete search history.

(56) References Cited

U.S. PATENT DOCUMENTS

| | | | |
|---|---|---|---|
| 8,896,652 B2 | 11/2014 | Ralston | |
| 9,003,455 B2 | 4/2015 | Hulse et al. | |
| 9,712,847 B2 | 7/2017 | Malladi et al. | |
| 10,279,252 B2 | 5/2019 | Gault et al. | |
| 10,390,039 B2 | 8/2019 | Zhu et al. | |
| 10,445,901 B2 | 10/2019 | Sato | |
| 10,523,953 B2 | 12/2019 | Zhu et al. | |
| 10,575,007 B2 | 2/2020 | Sun et al. | |
| 11,095,877 B2 | 8/2021 | Kumar et al. | |
| 2003/0206179 A1* | 11/2003 | Deering | H04N 9/3185 345/589 |
| 2007/0047640 A1* | 3/2007 | Venna | H04N 21/64322 375/E7.279 |
| 2010/0064324 A1* | 3/2010 | Jenkin | H04N 21/42607 725/59 |
| 2010/0079480 A1* | 4/2010 | Murtagh | G06T 11/60 345/592 |
| 2010/0106798 A1 | 4/2010 | Barreto et al. | |
| 2010/0223357 A1 | 9/2010 | Einarsson et al. | |
| 2013/0332811 A1* | 12/2013 | Chang | G06F 40/18 715/217 |
| 2016/0373546 A1* | 12/2016 | Lotfallah | H04N 21/4331 |
| 2019/0342356 A1 | 11/2019 | Thomas et al. | |
| 2020/0128307 A1* | 4/2020 | Li | H04N 19/119 |
| 2021/0011677 A1 | 1/2021 | Rao | |
| 2022/0256253 A1 | 8/2022 | Lazar et al. | |

FOREIGN PATENT DOCUMENTS

| | | |
|---|---|---|
| KR | 20170041203 A | 4/2017 |
| WO | WO-2016054651 A1 | 4/2016 |

OTHER PUBLICATIONS

Coldewey, D. Wave One aims to make video AI-native and turn streaming upside down. Dec. 1, 2020. Accessed at www.techcrunch.com/2020/12/01/waveone-aims-to-make-video-ai-native-and-turn-streaming-upside-down/.
JPEG Committee. Overview of JPEG AI. Joint Photographic Experts Group. (2021). Accessed at www.jpeg.org/jpegai.
MPEG. Moving Picture Experts Group. Home page. (2021). Accessed at www.mpegstandards.org.
News. About JPEG. Joint Photographic Experts Group (2021). Accessed at www.jpeg.org/about.
Schoon, B. Google's family of AV1 codecs are targeted to be royalty-free focusing on the algorithms that have expired or royalty-free patents or licensing. 9to5Google. Jan. 16, 2021. Accessed at www.9to5google.com/2021/01/16/google-android-tv-av1-codec-requirement.
The JPEG XS. About JPEG XS. Joint Photographic Experts Group. (2021). Accessed at www.jpeg.org.

* cited by examiner

ECO-FRIENDLY CODEC-BASED SYSTEM FOR LOW LATENCY TRANSMISSION

CROSS-REFERENCE

This application claims the benefit of U.S. Provisional Patent Application No. 63/069,475, filed on Aug. 24, 2020, which is incorporated herein by reference in its entirety.

BACKGROUND

Many people in society today are familiar with using network-connected computers to stream multimedia, including reading articles, viewing images, watching movies, and listening to music. Although large segments of consumers largely restrict their online activities to such tasks, computing resources are not necessarily available to provide these resources to all users quickly and cheaply. Many computing devices require large amounts of computing power in order to perform additional tasks not often performed by these consumers. These computing devices, due to their increased computing power, cost more as a result. Thus, even basic media-processing capabilities are denied to large segments of the population.

One method of reducing latency is to transmit smaller amounts of information across a communication channel. Engineers may use compression to reduce the bit rate of digital media. Compression may decrease the cost of storing and transmitting video information by converting the information into a lower bit rate form. A codec (encoder/decoder system) may be implemented to compress the information prior to transmission and decode (reconstruct from the compressed form) the digital media prior to playback.

For various types of media, including digital audio and video, codec standards have been adopted (e.g., H. 264). Standards may define options for syntax of an encoded media bitstream, detailing parameters in the bitstream when particular features are used in encoding and decoding. A codec standard may also provide information about decoding operations to perform and achieve conforming results in decoding.

SUMMARY

There is a need for computing systems and methods that can provide basic computing functions efficiently (e.g., low latency when streaming) and with low cost to consumers and businesses. The present disclosure provides these functions by implementing a client-server system. The client-server system can leverage a codec's ability to compress media to enable users to stream media without requiring a powerful processor. Additional innovations as described herein can maintain a low-latency environment while reducing monetary costs to consumers and energy costs to the environment.

In one aspect, a system for providing a low-latency media transmission, is disclosed. The system comprises one or more servers for providing one or more transmissions of media content, wherein the one or more transmissions comprise a plurality of video frames, a client for presenting the one or more transmissions of said media content. The client includes a software application for blending one or more pixels of the transmissions from one or more of the servers. The client further includes a cache for storing a downloaded media file, a codec for compressing the one or more transmissions. The codec is installed on the client and the server. The system also includes a dedicated communication channel connecting the client to the server.

In some embodiments, the client is a thin client.

In some embodiments, the blending comprises separating a first pixel of a first video frame of a first transmission into first red, green, and blue components and separating a second pixel of a second video frame of a second transmission into second red, green, and blue components, weighting a first combination of the first and second red components with first alpha and a second alpha, weighting a second combination of the first and second green components with the first alpha and the second alpha, weighting a third combination of the first and second blue components with the first alpha and the second alpha, and producing a blended pixel using the weighted combinations of first and second red components, first and second blue components, and first and second green components.

In some embodiments, the first alpha is a checksum of equivalences of the first red, the first green, and the first blue components.

In some embodiments, an equivalence of 0 produces an opaque pixel and an equivalence of 1 produces a semi-transparent blended pixel.

In some embodiments, the software application is configured to produce a 25% latency improvement.

In some embodiments, herein the first transmission is media content from a first widget and the second transmission is media content from a second widget.

In some embodiments, the first, second, and third combinations are sums.

In some embodiments, the weighting is performed in part by normalizing the first alpha, the second alpha, and the third alpha.

In another aspect, a system for providing a low-latency media transmission is disclosed. The system includes one or more servers for providing one or more transmissions of media content. The one or more transmissions comprise a plurality of video frames. The system also includes a client for presenting the one or more transmissions of said media content. The client includes a software application for blending one or more pixels of the transmissions from one or more of the servers. The client further includes a cache for storing a downloaded media file comprising an image with an arbitrary resolution and a view port for viewing portions of the downloaded media file. The client further includes a codec for compressing the one or more transmissions. The codec is installed on the client and the server. The system further includes a dedicated communication channel connecting the client to the server.

In some embodiments, the downloaded media file is entirely downloaded prior to viewing.

In some embodiments, the view port is capable of responding to a scroll by a user to present local content of the downloaded media file.

In some embodiments, local content is presented by adjusting an offset in the cache.

In another aspect, a system for providing a low-latency media transmission is disclosed. The system includes one or more servers for providing one or more transmissions of media content. The one or more transmissions comprise a plurality of video frames. The system also includes a client for presenting the one or more transmissions of the media content. The client includes a software application for blending one or more pixels of the transmissions from one or more of the servers. The client further includes a cache for storing a downloaded media file. The client further includes a codec for compressing the one or more transmissions. The codec does not apply a negotiation header to a transmission of the one or more transmissions. The codec is configured to not place a portion of a transmission of the one or more transmissions in a buffer. The codec is installed on the client and the server. The system further includes a dedicated communication channel connecting the client to the server.

In some embodiments, the codec comprises an encoder and a decoder.

In some embodiments, the encoder compares a current frame to a previous frame and encodes and decodes changes using a lookup table.

In some embodiments, the encoder implements a low pass filter to soften sharp changes in color from the previous frame to the current frame.

In some embodiments, comparing a current frame to a previous frame comprises calculating difference residuals.

In some embodiments, run length encoding is applied to the difference residuals.

In some embodiments, the encoder produces a compressed file in part from the run length encoded difference residuals.

In some embodiments, the lookup table is configured to provide a location of a corresponding pixel of a reference frame In some embodiments, the lookup table is configured to provide a location of an offset pixel of a reference frame.

In some embodiments, the lookup table is configured to provide pixels from a predefined palette.

In some embodiments, the encoder transmits audio interleaved with higher priority than the video frames.

In some embodiments, the encoder separates a video frame of the plurality of video frames into lines of pixels, and further separates the lines of pixels into portions, wherein the portions are processed using parallelism.

In some embodiments, the encoder produces a compression ratio of 100:1.

In some embodiments, the encoder applies run length encoding.

In another aspect, a system for providing a low-latency media transmission is disclosed. The system includes one or more servers for providing one or more transmissions of media content. The one or more transmissions comprise a plurality of video frames. The system also includes a client for presenting the one or more transmissions of the media content. The client further includes a cache for storing a downloaded media file comprising an image with an arbitrary resolution and a view port for viewing portions of the downloaded media file. The client includes a software application for blending one or more pixels of the transmissions from one or more of the servers. The client further includes a cache for storing a downloaded media file. The client further includes a codec for compressing the one or more transmissions. The codec does not apply a negotiation header to a transmission of the one or more transmissions. The codec is configured to not place a portion of a transmission of the one or more transmissions in a buffer. The codec is installed on the client and the server. The system further includes a dedicated communication channel connecting the client to the server.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

DETAILED DESCRIPTION

Figure 1:
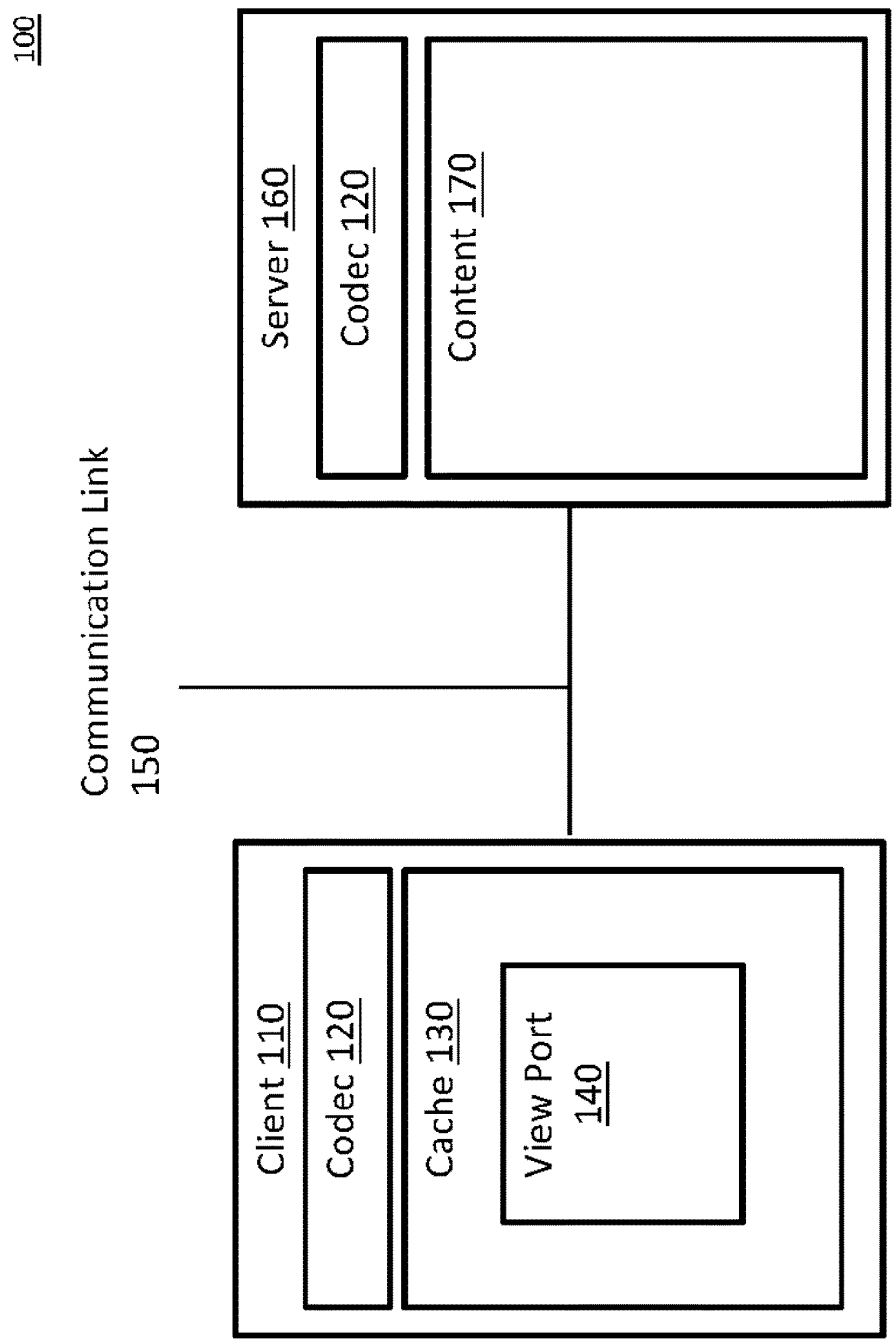
FIG. 1 illustrates a system for low-latency streaming with a codec-based client device.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Disclosed herein are systems and methods for implementing a client device configured for secure and efficient data transmission, presentation, and storage without requiring significant processing power. The client device uses an efficient codec to encode and decode data streams provided by a server. The disclosed codec may apply a compression ratio of 100:1 to media. The codec includes many innovative features that enable users to receive high-quality audio, video, and picture data efficiently. The disclosed system may be relatively inexpensive and environmentally friendly, as it may not require as much computing power as other conventional solutions, while providing quick access to images, video, or audio content as well as saving battery power and size. The disclosed system may encode and decode images without the use of graphics processing units or other hardware requiring significant power consumption.

The system disclosed, unlike other network systems in which client devices share a communication channel between themselves, can use a dedicated communication channel from client to server. This eliminates the needs for buffering of data and fixed negotiation headers, which may slow down data processing. The disclosed system also eliminates expensive support of legacy clients.

Additionally, the codec includes features for efficiently compressing image data while reducing information loss. Two such features are lookup tables and run length encoding. The lookup tables used may be configured to provide pixel values for video frames that reference previous frames or perform interpolation to input pixel values. The codec may also implement lowpass filters and noise reduction to ease viewing. The codec may operate on rows of pixels in images or video frames. This may enable massively parallel encoding and decoding of images, as multiple rows of pixels may be processed simultaneously. Additionally, processing rows of pixels may enable the images output by the codec to be sharper. Sharpness may be achieved by processing individual lines, so an image may not have patches and blurs resulting from the lossy compression of a convolutional representation of an entire block. A small loss in an encoded line may be almost unnoticeable.

Also included are a view port for viewing documents and elimination of alpha channels to reduce image sizes. Using the view port, a user can download an entire document into the client's cache instead of downloading portions of the document that the user may scroll to. Although this may take time initially, the user may scroll to different portions seamlessly, without waiting for content to load. Elimination of alpha channels from encoded images may result in data savings, for example of up to 25% or in some instances greater than 25%.

The disclosed system may have many uses in addition to personal and enterprise computing environments. The system may be used with broadcast and archival systems as well. For example, a dedicated server may stream video media to one or more client devices for presentation for large amounts of customers, or may store large amounts of media data for quick access by archivists and historians. The system may be able to provide motion instructions that are interpreted by remote controlled vehicles carrying the codec. The system may also be able to stream video media viewable by screens of cameras mounted to the remote controlled vehicles.

The disclosed system may use efficient, low power-consumption techniques for encoding and decoding, including referencing previous frames when encoding video frames, linear interpolation, implementing lookup tables, and quantization.

System

FIG. 1 shows a system 100 for implementing a processor-free client 110. The system 100 includes a server 160, a processor-free client 110, a codec 120, and a communication link 150. The system 100 of FIG. 1 may include a dedicated connection between client 110 and server 160. Using the connection in such a manner can be advantageous because the system 100 need not have to buffer data that is being transmitted from the client 110 to the server 160. Because the channel may be dedicated and is not shared, there is no feedback that may reduce the bit rate or sampling rate. Bandwidth may be more predictable than browser traffic. Additionally, the system 100 may reduce latency by eliminating timestamps. Further, the disclosed system 100, in using a client 110 that does not have a processor, may reduce hardware complexity and power consumption compared to other existing systems.

The server 160 may provide resources, such as streaming media (e.g., audio, video, or images) to the client 110. The server 160 may be a physical server machine or a cloud server. The server 160 may transmit files to the client 110 encoded by the codec 120, which are then decoded at the client 110. The server 160 may use a video card, a sound card, or a graphics card to perform one or more digital to analog conversions of media content. The hardware may perform digital to analog conversion using a reconstruction filter. The hardware may include a random access memory digital to analog converter (RAMDAC) to translate pixel data into an analog signal that a monitor of the client 110 may display as an image or video frame. The server 160 may be configured such that pixel dimensions (e.g., 1920×1080) of images or video need not be transmitted to the client 110.

The server 160 may be an edge data center or cloud data provider connected by the client 110 through a dedicated channel. Such a dedicated connection may eliminate all other network traffic and establish net neutrality from the server 160 to third party providers. This may enable cost savings for a network channel provider. Bandwidth becomes predictable.

The client 110 may be a computing device for providing media to a user. The client 110 may not require a sophisticated processor and can present to users media provided by the server 160. The client 110 may include a monitor and speakers for transmitting video content. The client 110 may be a desktop or mobile computing device, such as a mobile phone, tablet computer, or laptop. The client 110 may be a thin client 110 optimized for establishing a remote connection with the server 160, providing an interface through which a user can remotely perform tasks using the server 160, as well as accessing stored media content and resources stored on the server 160. In order to provide this functionality, a thin client embodiment may support peripherals including keyboards, mouse, monitors, jacks for sound peripherals, and ports for various devices. The client 110 may include tools such as a graphical user interface, a web browser, and a terminal emulator to enable access to server 160 functions and resources.

The client 110 may include remote desktop protocol software installed to replicate screen content on its display. For example, the remote desktop protocol software may replicate content provided by one or more microservices on one or more servers. The remote desktop protocol software may combine the presentations of these microservices by using an algorithm for blending video content, e.g., the algorithm described in FIG. 2.

The client 110 may be configured to avoid the use of negotiation headers. Not using negotiation headers may reduce the engineering resources needed to implement and maintain the codec 120. Additionally, not using negotiation headers may remove constraints. To ensure that pixels are placed appropriately within the image, the codec 120 may append end of file (EOF) and end of line (EOL) codes, which may be single data values.

The codec 120 may encode and decode media provided by the server 160 in order to compress the data while enabling high-quality playback on the client 110. The codec 120 may include an encoder and a decoder.

Figure 3:
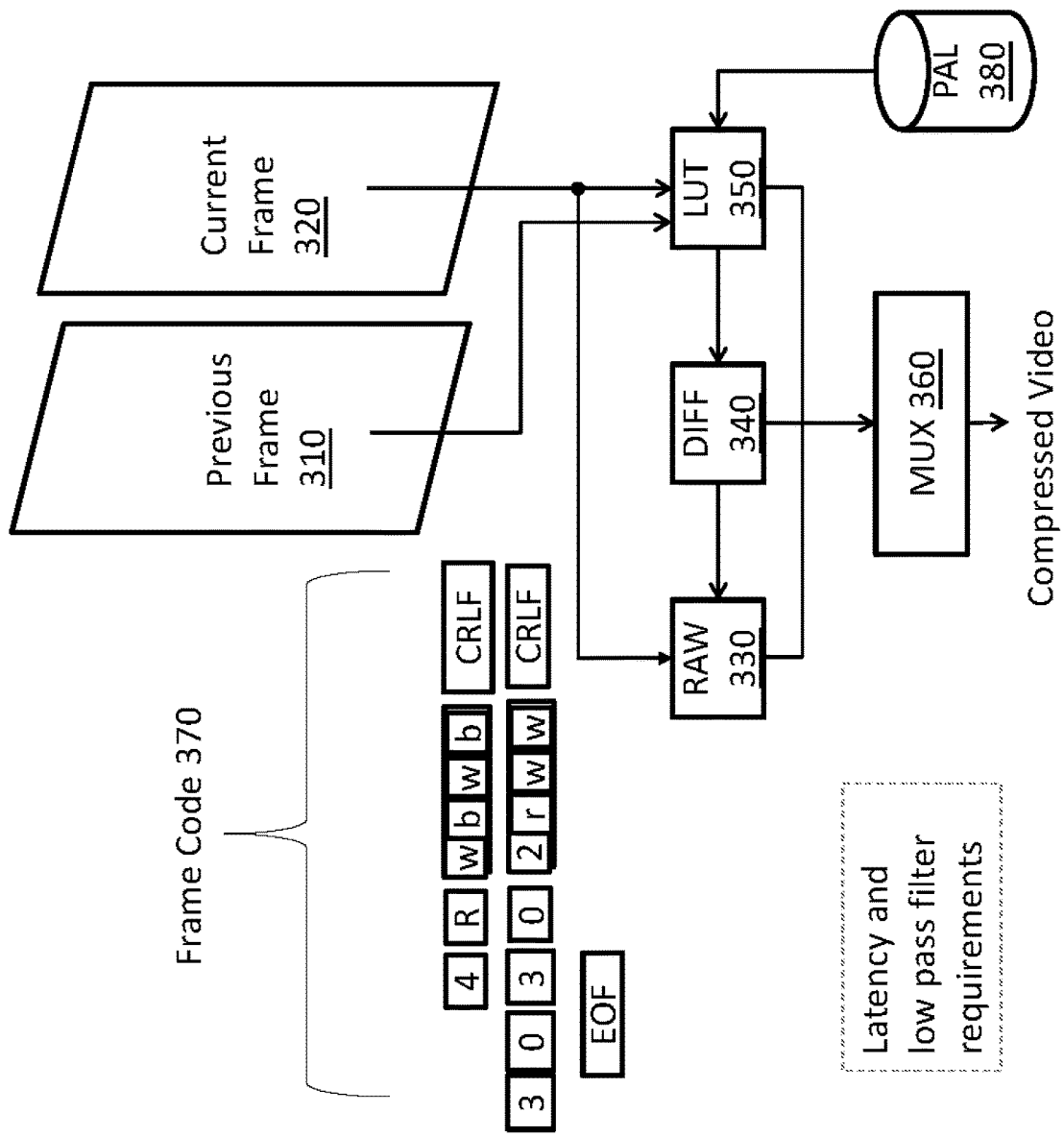
FIG. 3 illustrates an encoder architecture, in accordance with an embodiment.

The encoder may be the encoder 300 of FIG. 3 or, in other embodiments, may be configured to produce output compliant with other media encoding standards. The encoder may apply multiple processing steps to compress audio, image, or video content. For example, the codec 120 may apply lookup tables, calculate difference data, and filter the data during data processing. The codec 120 may be configured to enable users to remotely stream media content provided by the server 160 through a dedicated channel.

The encoder may receive a sequence of video frames and produce compressed information as output. In various embodiments, the encoder may determine frames that represent differences between frames (e.g., a current frame and a previous frame) to produce predicted frames. The encoder may save the residual difference values. The encoder may apply frequency transformation and quantization (in that order, or in reverse order) to frames. When the residual difference values are needed, the encoder may apply an inverse quantizer and inverse frequency transformer. The encoder may include an entropy coder to perform techniques such as arithmetic coding, differential coding, Huffman coding, and run length encoding. The entropy coder may stream the compressed video information immediately following compression, avoiding buffering. The encoder may use run length encoding of arbitrary number of blocks to support low latency parallel encoding and decoding.

The decoder may receive the compressed information over the communication link 150 and apply various decoding operations to form a reproduction of the video. For example, an entropy decoder may perform operations such as arithmetic decoding, differential decoding, Huffman decoding, and run length decoding. The decoder may apply difference information to reflect animation changes from the key frame. The decoder may then apply inverse quantization and/or inverse frequency transformation (in that order or in reverse order) to reproduce the video.

The communication link 150 may connect the server 160 and client 110. The communication link 150 may be, e.g., Ethernet or Wi-Fi. The communication link 150 may be a dedicated connection between the server 160 and client 110. Implementing the connection as a dedicated connection may provide for predictable available bandwidth, as there would be no interference from additional network traffic. Providing a dedicated channel may also reduce or eliminate the need for buffering of media data sent between the client 110 and server 160. Eliminating buffering confers additional benefits with respect to reducing latency, as without buffering, there is no need to capture strict time information and jitter reduction may be performed by the network. Additionally, eliminating buffering reduces support costs.

The view port 140 may represent publications and cartographical content using the codec 120 to decode content with arbitrary resolution. When a user clicks to view an image, the entire image is downloaded, filling a frame buffer cache. The local content is shown by adjusting an offset in the cache 130. This process enables subsequent page loads to be performed more quickly than those performed by loading content as the user scrolls. The system 100 reduces hardware density and energy use, while preserving smooth scrolling between portions of an image or document.

The cache 130 stores the document in memory. The entire document may be loaded into the cache 130 when it is requested from the server 160. When a user manipulates the view port 140, the system adjusts an offset in the cache 130 to display content associated with the location of the client view port 140.

The content 170 may be the content for display in the view port 140. The content 170 may be, e.g., an article or a map. The content 170 may comprise image-based content and may be of any arbitrary resolution.

Image Transmission

Figure 2:
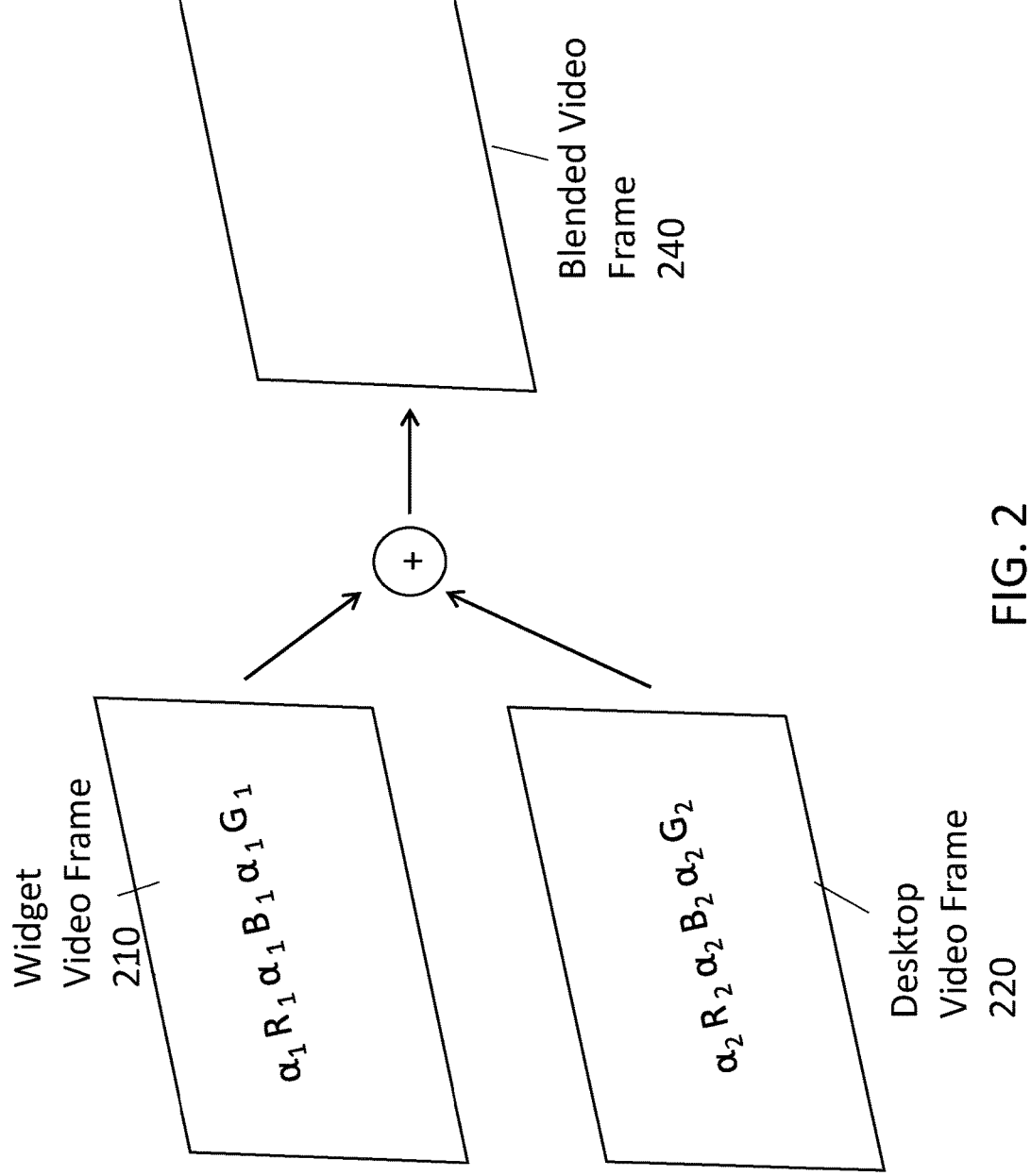
FIG. 2 illustrates a process for blending images from video frames.

FIG. 2 schematically illustrates a process 200 for transmitting image data hosted on multiple servers to the client 110. In an example scenario, a first microservice application may run as a first widget on a first server and a second microservice may run on a second server as a second widget. The servers may encode media using the codec 120 and transmit to the client 110, which may be located on a third server. The media may be blended for presentation on the desktop. For example, one of the widgets may be presented transparently on top of or behind the other, or vice-versa. The widgets may be presented in particular configurations on a desktop of the client (e.g., side by side). The system disclosed herein may produce a blended image comprising the visual configuration of the widgets and transmit the blended image to the client 110.

The system may blend an image by applying an alpha channel to each color component (e.g., red, green, and blue) of each pixel value of the image. For example, a first red component of a first image and a second red component of a second image may be blended by multiplying a first alpha by the first red component and dividing by two and summing it with a product of a second alpha and the second red component, also divided by two. This process may be repeated for the blue and green components. In other embodiments, the codec 120 may perform other types of multiplicative and additive operations with respect to color and transparency factors. The blending disclosed may reduce the color encoding of the pixels in the frame from 32 to 24 bits, removing the need for an 8-bit alpha.

FIG. 2 illustrates this operation for blending a desktop video frame 220 and a widget video frame 210 to produce a blended video frame 240. The desktop video frame 220 has its own red, green, and blue components with an associated alpha. The widget video frame 210 has its own red, green, and blue components with an additional associated alpha. These two frames are blended additively to produce the blended frame without extra normalization. The embodiment of FIG. 2 may be used to provide clients with interfaces for interacting with widgets on their client 110 desktop as they are accustomed to doing on standard computers.

In a desktop microservice, an algorithm may be implemented as follows. The algorithm may retrieve a pixel value associated with a widget, or of the intersection of two or more widgets. If the pixel is not associated with an intersection of the widgets co-located on the screen, the algorithm may transmit the pixel un-altered. If the pixel does correspond to an intersection of two or more widgets, it may be retained if it is opaque with an alpha of 100%. The algorithm may choose to present the pixel of the widget that is furthest to the front of the screen, or it may choose to present a sum of alpha channel-weighted pixels from the widgets to be presented on the screen. The alpha channel may itself be weighted by the number of bits used to encode the color of a pixel. For example, the alpha channel may be normalized to a range from 0 to 255, for 8-bit encoded colors. For example, instead of alpha being with a range of zero to one, alpha may be within a range of zero to 255, with 255 representing a 100% opaque pixel and 0 representing a 100% transparent pixel. A blended color value may be calculated by multiplying alpha/256 by each RGB color component divided by two. For example, a color may have [R, G, B, a]=[128, 128, 128, 128=50% transparency], and another color may have [R, G, B, a]=[256, 0, 0, 64=25%]. Blending the two may yield, e.g., for the red color value, 128/256*128/2+64/256*256/2=32+32=64. The system may use a similar process to calculate the G and B values. The alpha channels corresponding to each of the colors may have different values. If the pixel value chosen is not opaque, it may be blended with the desktop value to create a transparent image overlaid on top of the desktop. This may be performed for every image representing a widget overlaid on the desktop. The opacity of a pixel in a widget image may be represented by a reserved $24^{th}$ bit or an extra $25^{th}$ bit.

Alpha may be produced by a checksum of equivalences of red, green, and blue components. A least significant bit (LSB) may be reserved to indicate whether to use the pixel as is or blend it with the background. For example, an LSB of 0 may represent an opaque pixel, while an LSB of 1 may represent an alpha-weighted pixel that is blended into the background (semi-transparent blended pixel). The interpretation of the LSB may be inverted in case of full black (0,0,0) to preserve opaque black.

In many embodiments, a widget is blended with a desktop. The desktop may be larger than the widget and fully opaque, while the widget, being a smaller object than the desktop, may have areas (e.g., near the edges) that are fully transparent. To encode these areas for viewing, the system may use run-length encoded references to other fully transparent widget pixels to make only the desktop underneath the widget visible in these regions. The system may copy one or more blocks of N pixels entirely from a reference buffer. The server may persist these blocks as blocks of transparent pixels with alpha=0. These blocks may be used to form a background image, upon which one or more widget images may be blended. For example, two widget image elements may be isolated from their backgrounds using an alpha mask (rendering the image elements opaque and their backgrounds transparent). When the overlapping image elements are placed on the desktop, overlapping image regions of the overlapping image elements may be blended. The codec may persist non-overlapping regions of the widget image elements. Finally, the desktop may be viewable in place of the image element backgrounds that were rendered transparent by the alpha mask.

Encoder Architecture

FIG. 3 illustrates an encoder architecture for the codec 120, in accordance with an embodiment. The embodiment 300 is configured to encode frames of video data, but the system 100 may also implement codecs configured for transmission and playback of compressed audio or image files. The encoder 300 may be configured to operate in one or more modes, depending on the type of media communicated from the server 160 to the client 110. The encoder 300 system may be implemented as an operating system module, as part of an application library, or as a standalone application. The encoder consistent with the architecture 300 described herein may receive a sequence of video frames from a video source and produce compressed video data that is then output to the dedicated communication link 150 between client 110 and server 160. Generally, the encoder 300 compresses individual video frames before transmission. The encoder 300 compares the information in a current frame 320 to that from one or more previous frames using one or more lookup tables 350. For example, the lookup tables 350 may have pixel values which may relate to corresponding pixel values from previous frames. The relation may be a direct match to a previous pixel value or may be an offset in space. The circuit may store a difference between the raw pixel values of the frame and the lookup table values. If the raw values and lookup table values are largely identical, the difference may include a large number of zero values, which may be compressed using run-length encoding. Run-length encoding may be implemented in multiple ways. In some embodiments, run-length encoding may encode a set of repeating pixels as a code that preserves the pixel color information while requiring less memory. For example, a string "WBBWWW" may be encoded as "W2B3 W." In another embodiment, a run-length encoding algorithm may observe, in one row, a set of pixels that are the same, and use a gradual slope to determine a relationship between the pixels and create a reduced-memory representation. In this manner, a relatively small amount of pixel information may need to be transferred to the client 110, yielding a compression (e.g., of at least 12-16%) of the original size of the raw pixel frame. A frame may use multiple blocks of raw data. The frame data may be compressed using a lookup table. For example, a frame representing a 98% black and white document may use black and white from a LUT to compress the data from 24 bits to one bit. Run length encoding may further compress it an additional 50%, so key frames (e.g., a first transferred frame) may be transmitted as fast non-key frames per 1024 bytes, for example. Video may be encoded in the same manner as documents. As with documents, the system may filter the video. The encoder may perform a black-gray-white transition instead of a direct black-white. Also, the encoder may separate LSB values into the DIFF block and transfer only part of it. Audio may be transmitted interleaved with the visual content and may be compressed using encoding tasks such as quantization and masking. Audio may be transmitted as pulse code modulation (PCM). The encoder 300 may receive video as a sequence of video frames at a rate of, e.g., 60 frames per second. An arriving frame may be stored in a temporary memory storage area including multiple frame buffer storage areas. A frame selector may select a current frame 320 for processing from a storage area. The architecture 300 comprises a compression circuit including a raw data buffer 330, a difference encoder 340, one or more lookup tables 350, one or more multiplexers 360, and an output data stream. With respect to the video frame, the encoder 300 may cut every line into portions, which may then be encoded in parallel through two parallel channels. Portions may be short enough to be processed with more parallelism. The encoder 300 of this embodiment may compress an image to a small percentage (e.g. about six percent) of its original size.

The raw data stream may be uncompressed media (e.g., images, audio, or video) sent from the server 160 to the client 110. Raw video may be transmitted as individual image frames interleaved with audio. The encoder 300 may transmit the audio with higher priority than the video in order to avoid glitches from the transmission. A raw video frame may be an array of uncompressed pixels. A pixel may have a color depth of 24 bits.

The difference encoder 340 may store differences between the output of the lookup table and the raw, uncompressed data. The client 110 may decode the video using the difference data. Where there is not a difference between the lookup table output and the raw data, the encoder 300 may save space by run length encoding difference values of 0. The encoder may send the buffers of more significant bits compressed with the LUT first. Then, the encoder may send some of the values from the differences as we see fit. The next frame can encode the rest of the differences. For a 20% compression ratio, the encoder may encode the differences with the lookup tables and, which may fill 15% of the original buffer. The differences may add 20% more to the buffer, filling 35%. As this amount may fill too much of the buffer, the encoder may submit just ¼ of difference encoder data from a difference buffer (for example, removing least significant bits (LSBs)). The resulting stream may be 20% of the size of the original. The next frame may still see LSB differences and encode 15%. The difference encoder 340 may pack difference bits to the end of the stream, so they may be sent or may be recalculated and sent in the next frame. For example, there may be a noisy flat surface of 100 pixels with pixel values between 125 and 131. The encoder 300 may encode a run length of (100,LUT(128)) in 2 bytes and add an additive buffer to the end with the noise of 100×3 bits. If the noise does not fit, the encoder 300 may eliminate it and it will appear as a difference at the next frame having a chance to be transmitted.

The lookup tables (LUTs) 350 compare pixels from a current frame 320 to a reference frame (e.g., a previous image frame) to encode values for the current frame 320. The lookup tables 350 may be configured as arrays that receive as inputs coordinates (e.g., (x,y) coordinates) of pixel locations and provide locations of reference pixels from a reference image. The lookup tables 350 may be stored in memory on the server 160 or on the client 110. Using a lookup table to retrieve such values from memory may be more efficient than performing computations each time a frame is to be compressed. The tables may be precalculated or configured based on the content in the frames being transmitted. For example, if most of the pixels in the video frames do not change from frame to frame, the lookup table, when provided with an (x,y) coordinate, may reference a corresponding or equivalent (x,y) coordinate for the previous frame 310. The lookup tables 350 may be populated with pixel values from previous frames which may be offset. They may also contain pixel values of the current frame for key frames. For example, the lookup tables 350 may apply offsets of less than 24 bits of cached memory to previous pixel values. The lookup tables 350 may be populated with the pixel values of the previous frame 310 without any changes. The lookup tables 350 may also be populated with pixel values offset in particular directions (e.g., left). For texts and graphs, the lookup table may look up a value in a predefined palette of pixels for texts and graphs. The lookup tables 350 may be implemented using comparators. The comparators may support frame rate multiplication and fading. Additionally, using LUTs may remove artifacts of older compression formats caused by macroblocks of MPEG and H.264.

The multiplexer 360 may select the data to be provided as the compressed file and may select between the data from the LUT buffer and the raw data buffer 330 to encode. In order to select the correct data to compress, the multiplexer 360 may receive as input latency and low pass filter requirements from the server 160. The data from the raw data buffer 330 may be selected when it is smaller in size than the data from the LUT buffer. The difference data may be sent in a second buffer. For example, for black and white text with some font smoothing (TrueType), the encoder may send LUT data of 0 and 1 run length so that text is readable. The encoder may then send some differences (colored gray) in a second buffer after. If some granularity does not fit, the difference may be sent in the next frame compared to the next reference frame.

The encoder 300 may provide additional augmentations to the compressed data. The encoder 300 may implement a low pass filter to reduce jarring color transitions from frame to frame, in order to protect human eyes. For example, if a pixel were to transition from black in a previous frame 310 to white in a current frame 320, the low pass filter may encode the current pixel value as gray rather than white. In other cases, the low pass filter may smooth or blur one or more areas of the video frame in order to reduce jarring contrasts from frame to frame. The encoder 300 may also implement noise reduction. The least significant bits may be ignored by the encoder 300 or added to the end of the burst. For example, if a desired compression ratio is 20% and the buffer is 15% full, the encoder 300 may add 5% of noise.

The compressor may apply run length encoding on repeating patterns within the image, improving the compression ratio. This may enhance the compression, for example, by another 50%.

The frame code 370 shows codes for a raw encoded frame (4Rwbwb), a difference encoded frame (3P0303)(2Rww), carriage return codes (CRLF), and end of file (EOF) codes.

The programmable array logic 380 may be circuitry configured to implement any of the functions performed by the encoder 300. For example, the programmable array logic may implement one or more LUTs, difference encoders, and multiplexers.

The encoder system may perform progressive encoding. For example, the system may process a subset of lines of the image in parallel, before processing additional subsets of lines until all subsets of images have been processed.

Decoder System

The decoder system may receive encoded data for a compressed frame from the encoder 300 and produce output including decoded frames. The decoder may perform decoding tasks such as generating pixels iteratively from run length encoding and looking back and in tables. Pixel data may be additive, when a second array of differences arrive. Any decoding delays may be improved by parallel decoding later chunks in the stream if the network is too fast. When a frame is decoded, it may be stored in a frame buffer.

Codec

The system disclosed may use a low-latency audio, video, and graphics codec. The codec may leverage a dedicated channel, providing for predictable bandwidth. To reduce latency, the codec may attach image data to audio data and may omit timestamps. The codec may not require session or frame headers. The codec may be implemented on microcontrollers without requiring floating point instructions. The codec may process a media stream in a highly parallel fashion. The codec may use signal processing operations that are power-efficient.

The codec may be highly suitable for use with remote office applications, videoconferencing, remote driving, internet browsing, and local broadcasting.

Specifications

The codec may be able to compress an image to one-half its size, one-third its size, one-fourth its size, one-fifth its size, one-sixth its size, or less.

The codec may require a small portion of the connection bandwidth in order to encode and decode media effectively. For example, for a 200 Mbps connection, the codec may use a reserved 25 Mbps. Of this 25 Mbps, 20 Mbps may be used for video and about 3 Mbps may be used for audio. In some embodiments, the codec uses less than about 10%, less than about 15%, or less than about 20% of the network bandwidth. This may enable encoding of 64,000 pixels per color frame (e.g., VHS quality video at 60 Hz, CD quality at 16 Hz, HD quality at 4 Hz and 4K quality at 1 Hz).

The codec may implement progressive encoding. For example, in some embodiments, the codec may subsample an image, processing 2×2 or 4×4 blocks of the image. This may result in a 5% or 1.25% compressed media ratio. As in many applications (e.g., text chat applications, text document updates) a user may make small changes that do not update the entire frame in which content is presented, performing progressive encoding may smoothen any sudden changes in content. The progressive encoding may be configured to prioritize encoding of updated or updating pixels on the screen first.

The codec may not require any restrictions on resolution. A 5Gb universal serial bus (USB3) may replace a high-definition multimedia interface (HDMI) channel may provide a true color lossless 4K stream with a 5× compression ratio. The codec may enable parallel processing.

Compression

Compression of 20% may be achieved in the following way: Graphics that are not color rich may use lookup tables for coarse values using two-bit indices in palettes of four pixels. Text may be encoded using one bit.

Using other methods, images may rely on interpolation and a 256-color palette for flat and transient surfaces. When elements of images are updated, Subsequent updates may process residual frames. Using large palettes may increase encoding complexity and may make it more difficult for decompression to be performed in parallel. By contrast, the disclosed codec may use two, four, or sixteen-pixel palettes.

Some images may be able to transfer 2 bits per color component at a time. Encoding an image may employ four additional progressive updates to refine the image. The bit rate may be reduced by 4× in an update.

In some embodiments, the codec may compress real-world images with linear slope interpolation. Linear slope interpolation may not require floating point instructions for embedded and microcontroller applications. If at least eight pixels are encrypted at a time, the compression ratio may reduce to 20%.

Power Reduction

By not requiring floating point operations, implementing the disclosed codec may reduce power consumption. Additionally, due to the reduced power usage, smaller batteries may be required for processing electronics used to implement the codec.

Latency Reduction

The disclosed codec reduces latency by using a dedicated channel and by not using timestamps. Additionally, using uncompressed audio may reduce any decompression delays.

Additionally, the codec processes images such that there is not a dependency between lines of pixels. Lines of pixels may be split into arbitrary numbers of blocks until a 20% compression ratio is reached.

Audio

In some embodiments, the disclosed codec may provide 200 KHz audio, without compressing audio. The audio may be 200 kHz 16-bit sampled pulse code modulated (PCM) data. The codec may use a 100 Hz nominal framer rate, resulting in 4000 bytes of audio for a frame of 10 ms that may transfer in less than 1 ms over a 100 mbps channel, providing the low latency required.

The audio may be encoded prior to encoding video. Delay added to audio may be as low as 10 ms, driven only by the channel. Once a buffer of audio is collected, round-trip time for sending and receiving the audio may be only limited by the network bandwidth. An audio buffer comprising an audio block may not need to be processed (e.g., using a discrete cosine transformation). Instead, an audio block may be provided as pulses or may be slightly compressed using linear interpolation or run-length encoding. In some embodiments, low-importance audio may be compressed (e.g., silence or background noise). The codec may use video signal encoding algorithms to encode audio.

Audio may provide synchronization for the media content. Audio may be synchronized with the first display of the frame. Once the frame buffer is filled, the codec may swap the frame when it has completed playback of a block of audio, which may start processing of a next audio block. Progressive video updates may arrive during audio playback.

Audio may not be buffered or delayed. Quality of service may be achieved because the small bandwidth requirements of the codec may ensure that the channel is not saturated. Buffering may be limited to waiting until the previous audio buffer was played.

Base Frequency and Resolution

The codec may not employ a nominal frame rate. Instead, the length of the audio sample may specify the length of the video frame. The frame may not have a negotiation header to specify resolution of frame rate. This may reduce support and testing costs.

Small changes may be performed immediately if sufficient bandwidth is given with no delay. This may support real-time rendering of typing.

The codec may use a low pass filter of a video for convenience and compression on the encoder side. The codec may use no flickering on audio to support a diverse array of uses, including high-frequency voice. Filtering may reduce flickering, artifacts, and unnecessary bandwidth increases of noisy images. Higher frame rates may be filtered in the decoder code of the display.

View Port and Client Buffering

The codec may interoperate with a simple client, reducing fixed development costs. The codec may also reduce the variable cost of client hardware, as well as support engineering and audit costs.

The view port may have the following characteristics. The input data stream may be expanded into the memory of the client device featuring the viewpoint. The memory contains a rectangle bigger than what is displayed to the user, to enable more content to be stored for fast scrolling. The view port may be implemented using a double buffering technique reading from one and writing to the other buffer. The buffers may be swapped when audio of a read buffer stops playing and the first frame of a subsequent buffer plays. During a channel reset, if audio is interrupted or truncated on user input, the client may still display the frame buffer after the previous audio frame has stopped playback.

When a new image or frame is displayed in the view port, the audio may start playing while the image is progressively updated. For images, there may be a variable length array of 24 bit pixels. The size of the array may be up to 246 pixels long, but 2, 4, and 16-pixel palettes may be used. A pixel may represent a 1/60 degree viewing angle to maintain text quality.

The view port may be manipulated by client-driven actions, such as scrolling. The client may implement paging, scrolling, zooming, or cropping lines of the view port. Zooming may preserve image brightness and avoid interlacing or coarse subsampling. The view port may set a default height which may be the width of the previous frame. If a bigger image is loaded, it may follow into a new frame buffer. The codec may use high contrast interpolation. A two-pixel flat surface meeting another two-pixel flat surface may appear to have a sharp edge Ending a session may reset the client buffer.

Sections

There may be four section primitives of the codec.

A session may be a set of frames. Resetting a session may mean losing transmission of the media content. All local cache may be discarded. Session reset may be defined by the carrier. Upon startup, the client may load a black frame and silent audio. A server may send a reference frame (or I frame) by eliminating references to the previous frames and overwriting all pixels.

A frame may be a physical image and matching audio samples. Starting the frame may reset a cursor within the view port to a (0,0) reference point for subsequent data. The codec may reference and reuse pixels of a previous frame for a current frame. Frames may eventually be lossless, blending with latter frames with smaller gradual updates.

A row may be a horizontal line of pixels. Rows may be split into multiple buffers to enable parallel processing. A client may scan a buffer and expand a row asynchronously for low latency. When processing of a row has completed, the codec may perform a carriage return to begin processing a next row A pixel of the image may be a true color RGB24 pixel. It may represent a discrete portion of the image viewable at a particular angle (between 130° and 220°) from the human eye.

Update Process

A frame may receive the audio buffer first, followed by the image data. The audio buffer may be stored until the image data is swapped fully or progressively based on the last frame. The codec may start another audio buffer when the last audio buffer finishes playing, by swapping the next video buffer into the visible frame buffer. When a progressive image update occurs, the codec swaps it with the visible previous section of the current frame. The next frame is swapped when the next audio track finishes playback. In a low latency environment, a frame may be swapped if the audio is silent. A session reset may be used to interrupt the current audio and play different audio.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

Computer Systems

Figure 4:
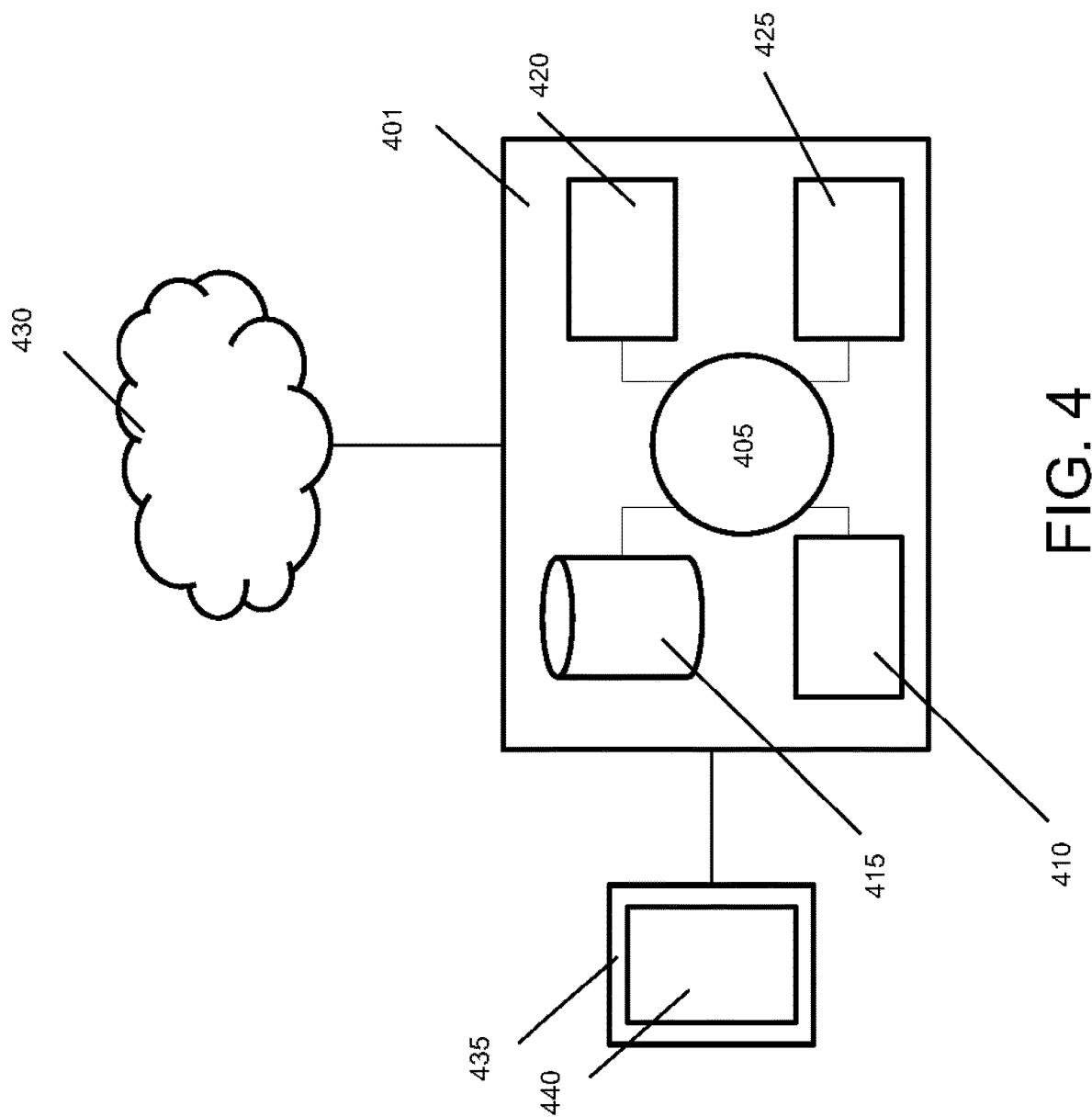
FIG. 4 shows a computer system that is programmed or otherwise configured to implement methods provided herein.

The present disclosure provides computer systems that are programmed to implement methods of the disclosure. FIG. 4 shows a computer system 401 that is programmed or otherwise configured to provide low-latency data transmission. The computer system 401 can regulate various aspects of transmitting data of the present disclosure, such as, for example, blending image content and encoding data. The computer system 401 can be an electronic device of a user or a computer system that is remotely located with respect to the electronic device. The electronic device can be a mobile electronic device.

The computer system 401 includes a central processing unit (CPU, also "processor" and "computer processor" herein) 405, which can be a single core or multi core processor, or a plurality of processors for parallel processing. The computer system 401 also includes memory or memory location 410 (e.g., random-access memory, read-only memory, flash memory), electronic storage unit 415 (e.g., hard disk), communication interface 420 (e.g., network adapter) for communicating with one or more other systems, and peripheral devices 425, such as cache, other memory, data storage and/or electronic display adapters. The memory 410, storage unit 415, interface 420 and peripheral devices 425 are in communication with the CPU 405 through a communication bus (solid lines), such as a motherboard. The storage unit 415 can be a data storage unit (or data repository) for storing data. The computer system 401 can be operatively coupled to a computer network ("network") 430 with the aid of the communication interface 420. The network 430 can be the Internet, an internet and/or extranet, or an intranet and/or extranet that is in communication with the Internet. The network 430 in some cases is a telecommunication and/or data network. The network 430 can include one or more computer servers, which can enable distributed computing, such as cloud computing. The network 430, in some cases with the aid of the computer system 401, can implement a peer-to-peer network, which may enable devices coupled to the computer system 401 to behave as a client or a server.

The CPU 405 can execute a sequence of machine-readable instructions, which can be embodied in a program or software. The instructions may be stored in a memory location, such as the memory 410. The instructions can be directed to the CPU 405, which can subsequently program or otherwise configure the CPU 405 to implement methods of the present disclosure. Examples of operations performed by the CPU 405 can include fetch, decode, execute, and writeback.

The CPU 405 can be part of a circuit, such as an integrated circuit. One or more other components of the system 401 can be included in the circuit. In some cases, the circuit is an application specific integrated circuit (ASIC).

The storage unit 415 can store files, such as drivers, libraries and saved programs. The storage unit 415 can store user data, e.g., user preferences and user programs. The computer system 401 in some cases can include one or more additional data storage units that are external to the computer system 401, such as located on a remote server that is in communication with the computer system 401 through an intranet or the Internet.

The computer system 401 can communicate with one or more remote computer systems through the network 430. For instance, the computer system 401 can communicate with a remote computer system of a user (e.g., a client device). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 401 via the network 430.

Methods as described herein can be implemented by way of machine (e.g., computer processor) executable code stored on an electronic storage location of the computer system 401, such as, for example, on the memory 410 or electronic storage unit 415. The machine executable or machine readable code can be provided in the form of software. During use, the code can be executed by the processor 405. In some cases, the code can be retrieved from the storage unit 415 and stored on the memory 410 for ready access by the processor 405. In some situations, the electronic storage unit 415 can be precluded, and machine-executable instructions are stored on memory 410.

The code can be pre-compiled and configured for use with a machine having a processer adapted to execute the code or can be compiled during runtime. The code can be supplied in a programming language that can be selected to enable the code to execute in a pre-compiled or as-compiled fashion.

Aspects of the systems and methods provided herein, such as the computer system 401, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 401 can include or be in communication with an electronic display 435 that comprises a user interface (UI) 440 for providing, for example, streaming video content. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 405. The algorithm can, for example, encode a video transmission.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system for providing a low-latency media transmission, comprising:
   one or more servers for providing one or more transmissions of media content, wherein the one or more transmissions comprise a plurality of video frames;
   a client for presenting the one or more transmissions of the media content, wherein the client includes a software application for blending one or more pixels of the transmissions from one or more of the servers, wherein the blending the one or more pixels of the transmissions comprises:
   for a first pixel of a first transmission, producing a first alpha from a checksum of equivalences of red, green, and blue components;
   processing the red, green, and blue components of the first pixel at least in part by multiplying the red, green, and blue components of the first pixel of the first transmission by the first alpha; and
   generating summed red, green, and blue components of a blended pixel from at least the processed red, green, and blue components of the first pixel;
   wherein the client further includes a cache for storing a downloaded media file;
   a codec for compressing the one or more transmissions, wherein the codec is installed on the each of client and the server, wherein the codec does not require a session header, negotiation header, or frame header; and
   a dedicated communication channel connecting the client to the server.

2. The system of claim 1, wherein the client is a thin client.

3. The system of claim 1, wherein herein the first transmission is media content from a first widget and the second transmission is media content from a second widget.

4. The method of claim 1, wherein the blending the one or more pixels of the transmissions further comprises:
  for a second pixel of a second transmission, producing a second alpha from a checksum of equivalences of red, green, and blue components;
  processing the red, green, and blue components of the second pixel at least in part by multiplying the red, green, and blue components of the second pixel of the second transmission by the second alpha; and
  summing the processed red, green, and blue components of the second pixel to the generated summed red, green, and blue components of the blended pixel.

5. A system for providing a low-latency media transmission, comprising:
  one or more servers for providing one or more transmissions of media content, wherein the one or more transmissions comprise a plurality of video frames;
  a client for presenting the one or more transmissions of the media content, wherein the client includes a software application for blending one or more pixels of the transmissions from one or more of the servers, wherein the blending the one or more pixels of the transmissions comprises:
  for a first pixel of a first transmission, producing a first alpha from a checksum of equivalences of red, green, and blue components;
  processing the red, green, and blue components of the first pixel at least in part by multiplying the red, green, and blue components of the first pixel of the first transmission by the first alpha; and
  generating summed red, green, and blue components of a blended pixel from at least the processed red, green, and blue components of the first pixel,
  wherein the client further includes a cache for storing a downloaded media file comprising an image with an arbitrary resolution and a view port for viewing portions of the downloaded media file;
  a codec for compressing the one or more transmissions, wherein the codec is installed on each of the client and the server, wherein the codec does not require a session header, negotiation header, or frame header; and
  a dedicated communication channel connecting the client to the server.

6. The system of claim 5, wherein the downloaded media file is entirely downloaded prior to viewing.

7. The system of claim 5, wherein the view port is capable of responding to a scroll by a user to present local content of the downloaded media file.

8. The system of claim 5, wherein local content is presented by adjusting an offset in the cache.

9. A system for providing a low-latency media transmission, comprising:
  one or more servers for providing one or more transmissions of media content, wherein the one or more transmissions comprise a plurality of video frames;
  a client for presenting the one or more transmissions of the media content, wherein the client includes a software application for blending one or more pixels of the transmissions from one or more of the servers, wherein the blending the one or more pixels of the transmissions comprises:
  for a first pixel of a first transmission, producing a first alpha from a checksum of equivalences of red, green, and blue components;
  processing the red, green, and blue components of the first pixel at least in part by multiplying the red, green, and blue components of the first pixel of the first transmission by the first alpha; and
  generating summed red, green, and blue components of a blended pixel from at least the processed red, green, and blue components of the first pixel, wherein the client further includes a cache for storing a downloaded media file;
  a codec for compressing the one or more transmissions, wherein the codec does not use a negotiation header, session header, or frame header during processing of the one or more transmissions, wherein the codec is configured to not place a portion of a transmission of the one or more transmissions in a buffer; wherein the codec is installed on each of the client and the server; and
  a dedicated communication channel connecting the client to the server.

10. The system of claim 9, wherein the codec comprises an encoder and a decoder.

11. The system of claim 10, wherein the encoder compares a current frame to a previous frame and encodes and decodes changes using a lookup table.

12. The system of claim 11, wherein the encoder implements a low pass filter to soften sharp changes in color from the previous frame to the current frame.

13. The system of claim 11, wherein comparing a current frame to a previous frame comprises calculating difference residuals.

14. The system of claim 13, wherein run length encoding is applied to the difference residuals.

15. The system of claim 14, wherein the encoder produces a compressed file in part from the run length encoded difference residuals.

16. The system of claim 11, wherein the lookup table is configured to provide a location of a corresponding pixel of a reference frame, pixels from a predefined palette, or a location of an offset pixel of a reference frame.

17. The system of claim 10, wherein the encoder transmits audio interleaved with higher priority than the video frames.

18. The system of claim 10, wherein the encoder separates a video frame of the plurality of video frames into lines of pixels, and further separates the lines of pixels into portions, wherein the portions are processed using parallelism.

* * * * *